K. WESSEL.
MACHINE FOR MAKING GRASS TWINE.
APPLICATION FILED JAN. 2, 1902.

945,653.

Patented Jan. 4, 1910.
7 SHEETS—SHEET 1.

K. WESSEL.
MACHINE FOR MAKING GRASS TWINE.
APPLICATION FILED JAN. 2, 1902.

945,653.

Patented Jan. 4, 1910.
7 SHEETS—SHEET 4.

K. WESSEL.
MACHINE FOR MAKING GRASS TWINE.
APPLICATION FILED JAN. 2, 1902.

945,653.

Patented Jan. 4, 1910.
7 SHEETS—SHEET 6.

UNITED STATES PATENT OFFICE.

KARL WESSEL, OF ST. PAUL, MINNESOTA.

MACHINE FOR MAKING GRASS TWINE.

945,653.  Specification of Letters Patent.  Patented Jan. 4, 1910.

Application filed January 2, 1902. Serial No. 88,027.

*To all whom it may concern:*

Be it known that I, KARL WESSEL, a citizen of the United States, residing at St. Paul, in the county of Ramsey and State of Minnesota, have invented a new and useful Machine for Making Grass Twine, of which the following is a specification.

This invention relates to machines for making grass twine.

The object of the invention is to provide a machine which is exceedingly simple in construction and arrangement and efficient in operation for making grass twine.

The invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon,—

Fig. 2, is a similar view of the front or delivery end of the machine.

The same part is designated by the same reference sign wherever it occurs throughout the several views.

In its general purview my invention contemplates means for feeding the stems or stalks of grass, hay or other similar material in longitudinal relation and combing or straightening the same, while at the same time a stretching effect is applied thereto in order to secure uniformity in the feed of the material and in the distribution of the stems or stalks in the formation of twine so as to secure uniformity in the diameter of the finished product, the material being suitably directed and formed into twine and wrapped with a binder thread or cord and delivered from the machine as a finished product and upon suitable receiving reels, and I have devised an exceedingly simple and efficient apparatus for accomplishing the desired objects. While I have shown and will now describe a construction of apparatus embodying these general principles, I desire it to be understood that my invention is not to be limited or restricted to the specific details of construction and arrangement shown, as many variations therefrom and changes therein would readily suggest themselves to persons skilled in the art and still fall within the spirit and scope of my invention.

Figure 7:
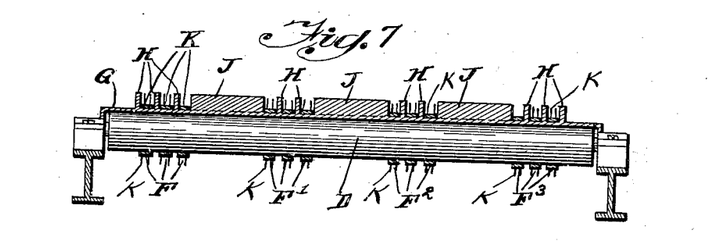
Fig. 7, is a transverse sectional view on the line 7, 7, Fig. 5, looking in the direction of the arrows.

In the accompanying drawings, reference sign A, designates a framework of suitable construction and arrangement for supporting the various operating parts of the apparatus. Suitably journaled in the framework is a main drive shaft B, adapted to receive rotation from any suitable or convenient source, as, for instance, through the usual belt pulleys C, and from which the various operating parts are driven. At the rear or feed-in end of the frame is suitably journaled rollers D, E, spaced a suitable distance apart and over which rolls operate feed belts F, F', F², F³, and preferably arranged in groups, each group containing one or more belts. In the drawings I have shown four sets of these belts, but I do not desire to be limited to any number of sets. Intermediate the rolls D, E, the belts F, F', etc., operate over supporting plates G, (see Fig. 7) said plates having vertically extending division plates H, forming compartments in which the belts are received, said belts forming the bottoms of said compartments. Intermediate the adjacent sets of feed belts are supporting plates J, the height of which is preferably on a level with or in the same horizontal plane as the top edges of the division plates H. The supporting plates J, afford a preliminary support for the material to be placed in the channels formed between the division plates H. One of the rolls D, E, may be driven in any suitable or convenient manner so as to actuate the feed belts F. If necessary or desirable, the feed-in belts F, F', etc., may be provided with projecting spikes or pins K, which aid in effecting the feed of the grass stems or stalks. These pins do not extend above the top edges of the division plates H, or supporting plates J, and may terminate somewhat below the upper surfaces of these parts, in order to avoid danger of injury to the hands of the operator in placing the material in position to be fed by the belts F, F', etc.

In the operation of the machine, the grass, stems or stalks are placed by hand or otherwise within the grooves or channels formed by the division plates H, and in longitudinal relation with respect thereto, and the attendant maintains these channels or grooves filled with the grass during the continuous operation of the machine, so that as fast as the stems or stalks are fed through and from the channels or guideways by the feed belts F, F', etc., fresh supplies of the stems or stalks are placed in said guideways. In other words, the attendant keeps the guideways or channels constantly filled. The actuation of the feed belts F, F', etc., effects a feed or delivery of the stalks of grass in a continuous stream to feed rolls L, M, suitably journaled in the machine frame and which extend transversely of the frame. The upper of these rolls may be mounted for yielding pressure against or toward the lower roll in any ordinary, convenient or well understood manner. The lower roll may be driven in any suitable manner, but preferably at a somewhat higher rate of speed than the speed of actuation of the belts F, F', etc., and consequently at a somewhat higher rate of speed than the speed of delivery of the grass to such rolls. By this arrangement, the material is grasped between the rolls and is drawn from the feed belts F, F', etc., and progressed onward toward the front or delivery end of the machine. In practice, for every five revolutions of shaft E, which drives the feed belts F, F', F², etc., the feed roller M, is driven five and one-eighth revolutions. I do not desire, however, to be limited to this exact relative proportion, as the same may be varied according to the exigencies.

Figure 1:
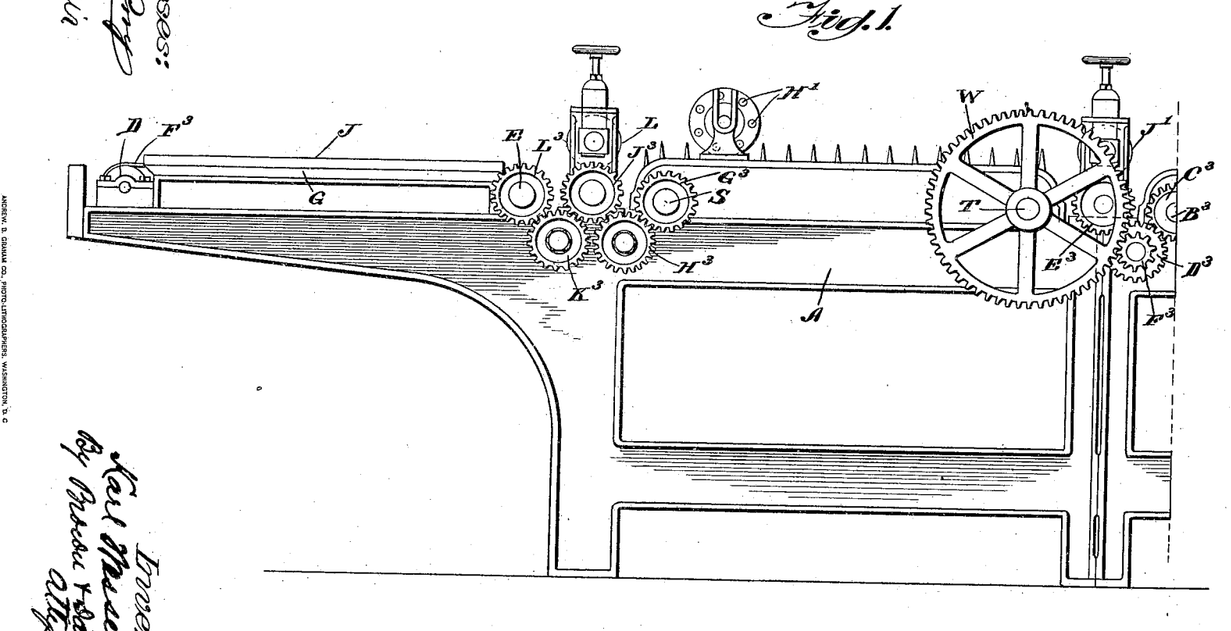
Figure 1, is a view in side elevation of the rear or feeding portion of a machine embodying the principles of my invention.
Figure 3:
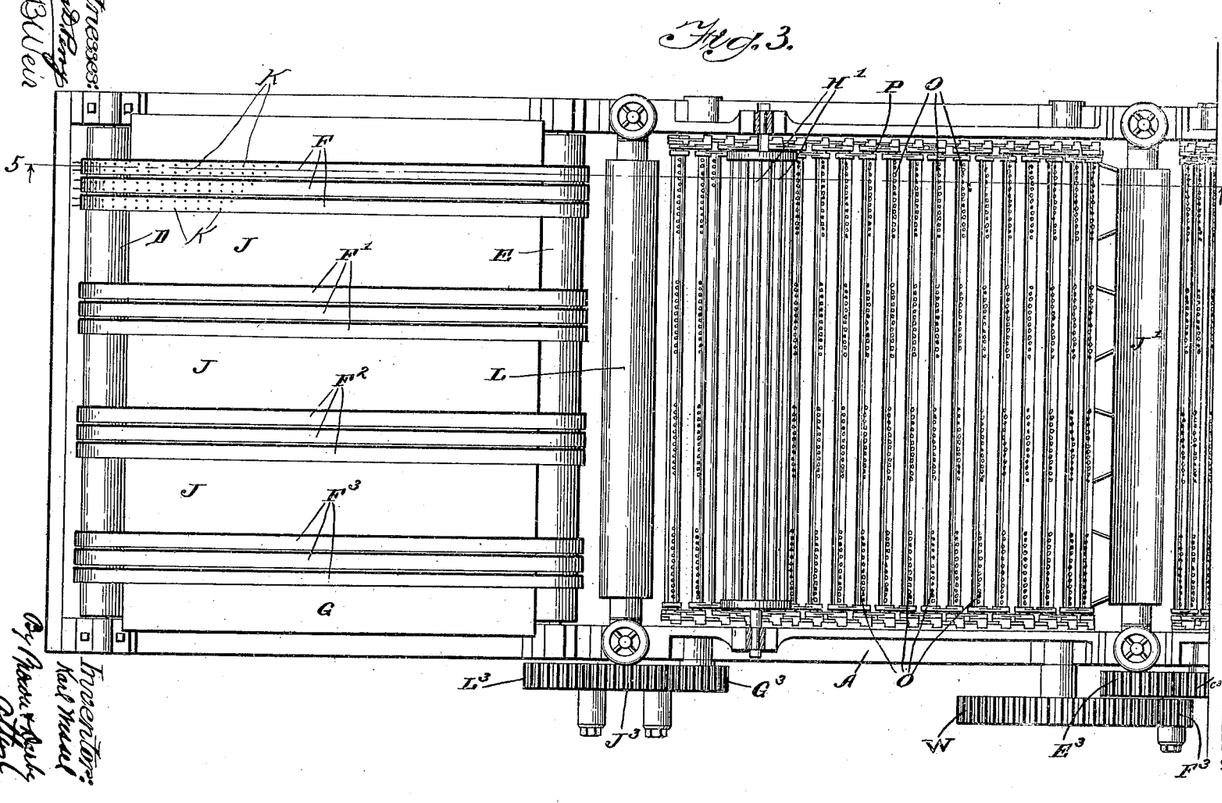
Fig. 3, is a top plan view of the construction shown in Fig. 1.
Figure 5:
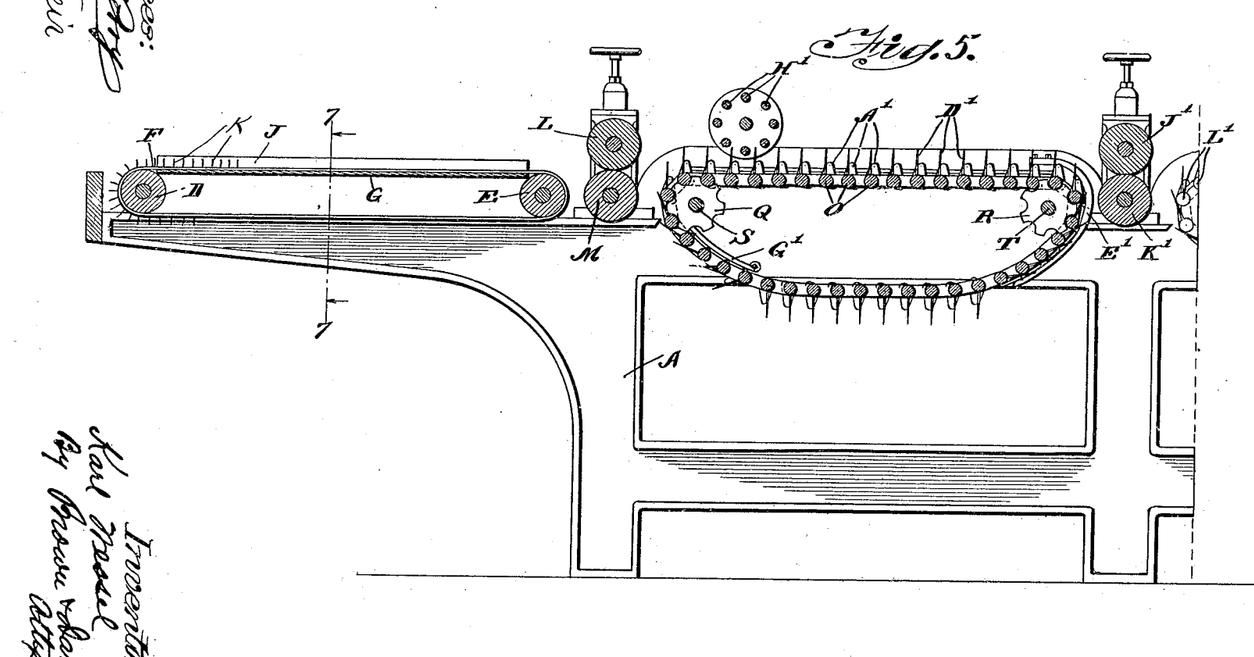
Fig. 5, is a vertical central longitudinal section on the line 5, 5, Fig. 3, looking in the direction of the arrows.
Figure 6:
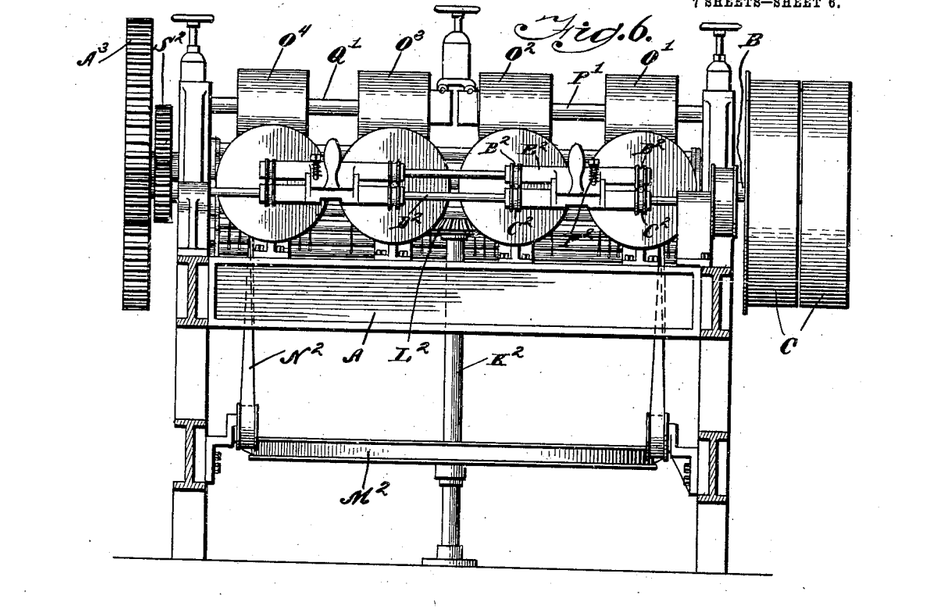
Fig. 6, is a front end elevation, parts in vertical transverse section, on the line 6, 6, Fig. 4, looking in the direction of the arrows.
Figure 8:
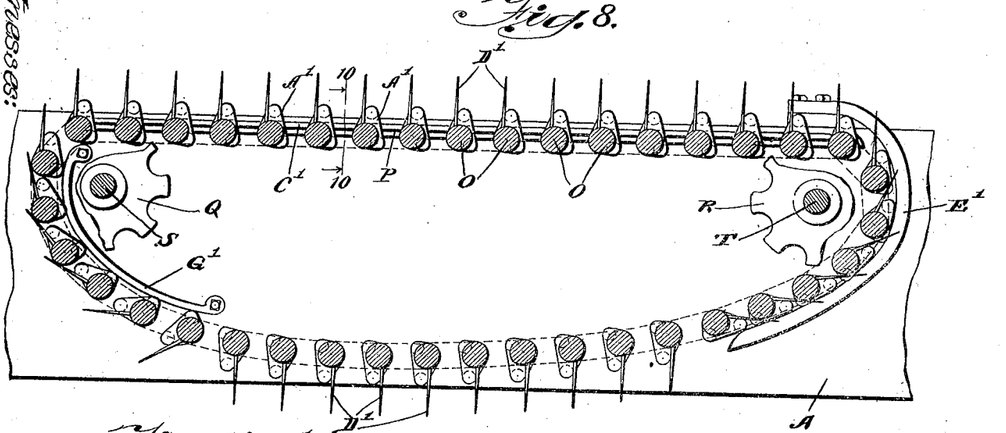
Fig. 8, is a view in vertical longitudinal section on a somewhat enlarged scale, parts broken out, of an endless feed carrier employed in connection with my invention.
Figure 9:
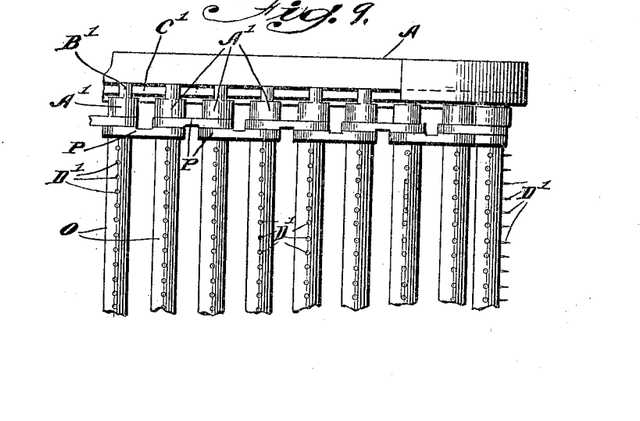
Fig. 9, is a broken detail view in top plan of the construction shown in Fig. 8.
Figure 10:
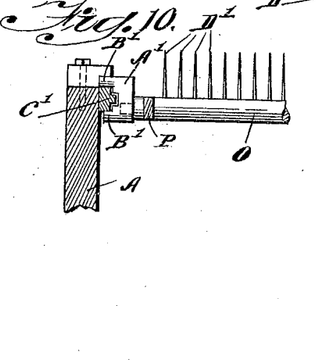
Fig. 10, is a broken detail view in transverse section on the line 10, 10, Fig. 8, looking in the direction of the arrows.

The material is delivered from the feeding rolls L, M, to an endless conveyer comprising a series of transverse rods O, suitably connected together by links P, into an endless belt form, said belt operating over and being actuated by sprocket wheels Q, R, suitably mounted upon shafts S, T, one of which may be driven in any suitable manner, as, for instance, by means of a gear W, mounted upon shaft T, and driven from the main drive shaft B, in any suitable manner. The ends of rolls or bars O, are carried in blocks A', said blocks having projecting fingers B', arranged to receive therebetween a guide bar C', mounted upon the side bars of the machine frame A, the function of which is to support and guide the bars or rolls O, and to cause the upper leg of the same to operate in a horizontal plane. Each bar or rod O, is provided with a series of pins or projections D', and the side guides C', which is received between the projecting fingers B', of blocks A', serve to maintain the pins D', of the rolls in vertical or upright position in the upper limb or leg of the endless conveyer which is composed of the link connected rods or bars O. The function of these pins or projections D', is to aid in effecting an efficient feed of the material, and it is important that these pins enter the material as delivered thereto, and also to be withdrawn from the material as delivered therefrom in a vertical or upright position, and it is also important and desirable that these pins while in engagement with the material be maintained in vertical or upright position. These results are secured by the blocks A', with their projecting fingers B', engaging or riding over the side guides C', during that part of the traverse of the carrier when the pins D', are engaged in the material. At the forward end of the carrier a curved guide E', (see Figs. 5 and 8) engages the upper finger B', of the blocks A', as the carrier is carried over the sprocket R, and by rocking said blocks A', thereby axially rocking the rollers or bars O, the pins D', of said rods or bars are maintained in vertical position during the withdrawal of said pins from the material being fed. After the ends of the curved guides E', are cleared by the fingers B', the rods or bars O, rock so as to cause the pins D', to hang downwardly, as clearly shown in Fig. 8. Adjacent to the rear end of the carrier is a similarly curved guide G', which engages the fingers B', of blocks A', and as the carrier proceeds around the sprockets effects a rotation of the rods or bars O, as clearly shown in Figs. 5 and 8, so as to again bring the pins D', into vertical position, thereby enabling said pins to enter the material in vertical and upright position, and also enabling the blocks A', to be brought into suitable position to receive between the projections B', thereof the side guides C', by which said blocks are held in proper position to maintain the upright relation of the pins D', during the forward movement of the upper leg of the carrier. If desired, and in order to efficiently press the material delivered to this carrier down upon the rods or bars O, and between the pins or projections D', thereon, I may journal a reel transversely of the machine and above the carrier, said reel comprising transverse rods or bars H', as clearly shown in Figs. 1, 3 and 5, the weight of said reel serving to efficiently press the material upon the carrier. In practice I prefer to drive or operate this carrier at a somewhat higher rate of speed than the speed of action of the feed rolls L, M. For instance, while the feed rollers L, M, make five and one-eighth revolutions the drive shaft of this feed carrier makes five and one-fourth revolutions. I do not desire, however, to be limited to this exact relative speed proportion, as the same may be varied to suit the requirements. From this feed carrier composed of the linked transverse rods or bars O, the material is delivered to feed rolls J', K', similar in arrangement to the feed rollers L, M, and similarly mounted. These feed rollers, however, I propose to drive at a much higher rate of speed than the speed of actuation of the carrier which delivers the material thereto. For instance, while the operating shaft of said carrier is driven at five and one-quarter revolutions the feed rollers J', K', or the driven member of said pair of feed rollers, will be driven at twenty-nine revolutions, though I do not desire to be limited to this specific relative speed of operation. By driving these feed rollers at a much higher speed than the speed of actuation of the carrier which delivers thereto, the material is grasped and quickly drawn from said carrier, and consequently the teeth or pins D', serve to effect a combing and straightening of any entangled or interlaced stems or stalks of the material.

Figure 4:
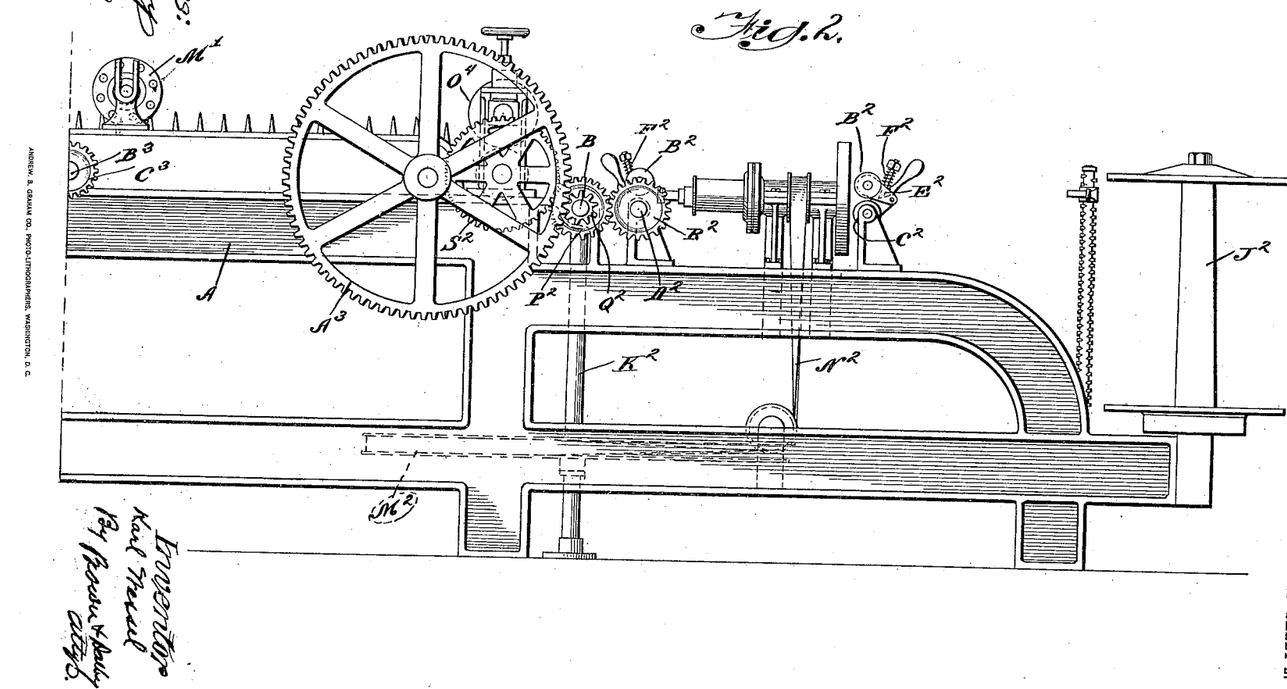
Fig. 4, is a top plan view of the construction shown in Fig. 2.

From the feed rolls J', K', one of which may be positively driven in any convenient manner as above indicated, the material is delivered to a second carrier, designated generally by reference sign L', (see Fig. 4) and which may be identical in construction and arrangement to the preceding endless carrier and over which may be arranged a reel, designated generally by reference sign M', which may be of the identical construction and arrangement as the reel operating over the preceding carrier. Inasmuch as the specific details of construction and arrangement of carrier L', is identical with that specifically shown in Figs. 5 and 8, I do not deem it necessary to repeat a detailed description thereof.

In practice I propose to operate the carrier L', at a somewhat higher rate of speed than the speed of actuation of the feed rollers J', K'. For instance, while the feed rollers J', K', or the driven member thereof, is making twenty-nine revolutions the actuating shaft of carrier L', is designed to make thirty revolutions.

In the foregoing description I have referred to the feed-in belts F, F', F², etc., as being arranged in sets, each set including one or more feed belts. It will be readily seen from this construction that the material is fed through the machine in separate masses and is so received by the feed carrier L'. From this carrier these separate masses are delivered between coöperating pairs of feed rolls, the upper member of each pair of which is indicated by reference signs O', O², O³, O⁴. The upper rolls O', O², are carried upon a shaft P', suitably journaled in journal boxes at the ends thereof, and similarly the rolls O³, O⁴, are carried upon a shaft Q', also suitably journaled in journal boxes at the ends thereof, the inner ends of said shafts P', Q', being journaled in boxes carried in a standard R', (see Fig. 4) and the journal boxes of said shafts P', Q', may be spring pressed in a suitable, convenient and well understood manner. Each of the upper rolls O', O², and O³, O⁴, coöperates with a positively driven lower roll S', between which the material delivered from the carrier L', is grasped. The lower rolls S', are positively driven in any suitable manner, but preferably at a much higher rate of speed than the speed of actuation of carrier L'. For instance, while the drive shaft of said carrier L', is making thirty revolutions the driven member of the pair of rolls O', O², etc., and S', is driven at 150 revolutions, thus drawing the material from the carrier L', and again effecting a combing operation and stretching the material and consequently reducing the same to proper and uniform dimensions. While passing from carrier L', to the rollers O', O², O³, O⁴, and S', each separate bunch or mass of the material is condensed so as to bring the material together into strand or twine form. This result is accomplished by means of chutes A², (see Fig. 4) said chutes extending forwardly of the rollers O', O², O³, etc., and converging, as clearly shown. From these converging chutes or guides which serve to condense the material into strand form, the material is delivered between pairs of coöperating rolls B², C². The rolls C², are mounted upon a shaft D², suitably journaled in the frame and driven positively in any convenient manner. The upper or coöperating rolls B², are preferably arranged in pairs, each pair being carried in a frame E², said frames being journaled upon shaft D², and acted upon by springs F², to yieldingly press the upper rolls B², into efficient engagement with their coöperating rolls C², and permitting slight relative movement of said pairs of rolls to accommodate for any inequality or unevenness in the strand of material passing therebetween. In practice I prefer to peripherally groove the rollers B², C², in order to form a suitable groove to receive the material. In practice I prefer to drive the rolls B², C², or the driven member of said rolls at very high rates of speed. For instance, while the delivery rolls O', O², O³, etc., and S', or the driven member of said rolls is making 150 revolutions, the rolls B², C², or the driven member thereof is making 300 revolutions, thus again exerting upon the material being fed a pulling or stretching effect to straighten the same out and to reduce the same to uniform density or diameter.

From each coöperating pair of rools, B², C², the condensed stretched strand of material and which is composed of overlapping stems or stalks of grass arranged in longitudinal or parallel relation is delivered to the winding mechanism, indicated generally by reference sign H², and each comprising a hollow spindle driven in any suitable manner, through which the material passes and by which the strand of material is supplied with a wrapping thread, twine or cord. The specific construction of this winding mechanism forms no part of my present invention and may be of the same construction as is disclosed in Patent No. 654,991, issued July 31, 1900, to George A. Lowry, and need not be herein more specifically referred to. From the winding mechanism the material is delivered to rolls B², C², arranged in coöperating pairs, and which may be identical in construction and arrangement and driven at the same rate of speed as the rolls B², C², above described, a specific description of which need not be repeated. From the last coöperating pairs of rolls B², C², the now finished product or twine is delivered to suitable reels J², in the manner set forth in the patent above referred to, and the specific construction, arrangement and mode of operation of which forms no part of my present invention.

The various mechanisms above referred to may be actuated by any simple, suitable or convenient arrangement of driving gearing. In the form shown, to which, however, the invention is not limited, a vertical shaft K², is driven from main drive shaft B, through bevel gears L², and upon said shaft K², is mounted a large pulley M², over which operates a belt N², by which the winding mechanisms H² are operated. Upon main drive shaft B, is mounted gears P², Q², the gear P², meshing with and driving gears R², S², the former of which is mounted upon and drives the shaft D², upon which are mounted the feed rollers C², of the first set of high speed feed rollers. The forward set of high speed feed rollers to which the material is delivered from the spinning or winding mechanisms H², is driven by belt connection T², from shaft D². The gear S², is mounted upon and drives the shaft carrying the feed roller S'. The gear Q², on main drive shaft B, drives a large gear A³, mounted upon the driving shaft of conveyer L'. The conveyer L', operates over its drive shaft and a coöperating shaft B³, at the forward end of said carrier, by which said shaft B³ is driven. Upon said shaft B³, is mounted a gear C³, arranged to mesh with and drive an intermediate gear D³, which also meshes with and drives a gear E³, upon the shaft of feed roller K'. Also connected to rotate with gear D³, is a smaller gear F³, arranged to mesh with and drive gear W, through which the rear carrier is actuated. The actuation of said rear carrier effects a rotation of the shaft S, upon which is mounted a gear G³, arranged to mesh with and drive an intermediate or idler H³, through which gear J³, is driven, said gear J³, being mounted upon and driving the feed roller M, and also through an intermediate gear K³, driving a gear L³, upon the actuating shaft of the feed-in belts F, F', F², etc. Similarly the reels J², may be driven in any suitable manner from the main drive shaft B. It is obvious that the various gearing for driving the operating parts of the apparatus may be of the desired relative diameters to produce the speed relations above set forth. It is also obvious that any other suitable or convenient arrangement of gearing may be employed without departure from the spirit and scope of my invention.

From the foregoing description it will be seen that I provide an exceedingly simple and efficient machine for making grass twine, wherein the material is fed through the machine in straight or parallel relation with respect to the stems or stalks of grass composing the strand of grass twine to be produced. It will also be seen that during its passage through the machine the stems or stalks of grass are not only straightened and maintained in parallel relation with respect to each other, but the material is stretched and consequently reduced to uniform thickness or diameter of the finished product. It will also be seen that I avoid waste, as all the stems or stalks of grass supplied to the machine are used or worked up to the finished product. It will also be seen that in the finished product a twine is produced in which the stems or stalks of grass lie parallel with respect to each other. This is a desirable feature where the twine is to be used for weaving into mats or other fabrics, or is employed in the manufacture of grass twine furniture or other articles. It will also be seen that the material is fed through the machine in separate bunches or masses, each bunch or mass producing a finished twine. Consequently the machine may embody as many different sets of mass or bunch feeding mechanisms as may be desired, four of such sets being shown in the drawings, and the only care or attention required is for the attendant to maintain the channels or ways in which the feed-in belts F, F', F², etc., operate, filled with the stems or stalks of the material, and this can be readily accomplished by hand, or in any other convenient manner.

I do not desire to be limited to the particular details of construction and arrangement shown and described; but, Having now set forth the object and nature of my invention, and a construction embodying the principles thereof, what I claim as new and useful and of my own invention, and desire to secure by Letters Patent, is:

1. In a machine for making grass twine, a framework, carrier belts mounted therein, channels in which said carrier belts are arranged to operate, each of said channels adapted to receive stems or stalks of grass in longitudinal relation with respect to the direction of feed of said carriers and in substantially parallel relation with respect to each other, and feeding devices arranged to receive said stems or stalks from said feeding belts and operating to condense the stems or stalks contained in each channel into a strand, and means for applying a wrapping thread to each strand, as and for the purpose set forth.

2. In a machine for making grass twine, a framework, carrier belts mounted therein, channels or guideways in which said feed belts operate, each of said channels or guideways adapted to receive stems or stalks of grass in longitudinal relation with respect to the direction of travel of said belts and in substantially parallel relation with respect to each other, feeding devices arranged to receive the material from said feed belts and condense the same into strand form, means for actuating said feeding devices at a higher rate of speed than the speed of operation of said belts and means for applying a wrapping thread to said strands, as and for the purpose set forth.

3. In a machine for making grass twine, a framework, rollers mounted therein, feeding belts operating over said rollers, means for actuating one of said rollers to operate said belts, guideways or channels interposed between said rollers and longitudinally through which said belts operate, each of said channels adapted to receive stems or stalks of grass in substantially longitudinal and parallel relation and in sufficient quantity to form a strand of finished twine, as and for the purpose set forth.

4. In a machine of the class described, a table having grooves or channels, each adapted to receive stems or stalks of grass, feed belts operating in said channels, a carrier, feeding rolls interposed between said feeding rolls and carrier, and means for driving said feed belts, feed rolls and carrier at differing speeds, as and for the purpose set forth.

5. In a machine of the class described, a table having channels, each adapted to receive stems or stalks of grass, endless carriers, feeding rolls interposed between said carriers, feed belts operating in said channels, feed rolls interposed between said feed belts and one of said carriers, and means for operating said several mechanisms at differing and increasing speeds, as and for the purpose set forth.

6. In a machine of the class described, feeding belts arranged in sets, each set containing one or more belts and adapted to receive the stems or stalks of grass in substantially longitudinal relation with respect thereto, feeding devices arranged to receive the material delivered from said feeding belts, means for condensing into strand or twine form the material delivered from each of said sets of feeding belts, a winding mechanism arranged to receive the condensed material from each of said condenser mechanisms, and means for actuating these several parts, as and for the purpose set forth.

7. In a machine of the class described, feeding belts arranged in sets, each set including one or more of said belts, channels or guideways in which said belts operate, said channels or guideways adapted to receive stems or stalks of grass in longitudinal relation with respect thereto and in parallel relation with respect to each other, feeding devices adapted to receive the material from said feeding belts, condenser mechanism for condensing the material into strand or twine condition, winding mechanism for applying to the condensed strands or twine a wrapping thread, and reels adapted to receive the wrapped twine, all combined and arranged as and for the purpose set forth.

In witness whereof I have hereunto set my hand, this 18th day of December, 1901, in the presence of the subscribing witnesses.

KARL WESSEL.

Witnesses:
E. C. SEMPLE,
S. E. DARBY.